United States Patent
Stein et al.

(10) Patent No.: US 11,492,732 B2
(45) Date of Patent: Nov. 8, 2022

(54) SAILCLOTH WITH FAIL-SAFE PROPERTIES

(71) Applicant: Dimension-Polyant GmbH, Kempen (DE)

(72) Inventors: Uwe Stein, Heinsberg (DE); Heiner Schillings, Heinsberg (DE)

(73) Assignee: Dimension-Polyant GmbH, Kempen (DE)

( * ) Notice: Subject to any disclaimer, the term of this patent is extended or adjusted under 35 U.S.C. 154(b) by 583 days.

(21) Appl. No.: 16/304,000

(22) PCT Filed: May 24, 2017

(86) PCT No.: PCT/EP2017/062677
§ 371 (c)(1),
(2) Date: Nov. 21, 2018

(87) PCT Pub. No.: WO2017/202996
PCT Pub. Date: Nov. 30, 2017

(65) Prior Publication Data
US 2019/0203386 A1    Jul. 4, 2019

(30) Foreign Application Priority Data
May 25, 2016    (DE) .......................... 102016109663.6

(51) Int. Cl.
| | |
|---|---|
| *D03D 1/00* | (2006.01) |
| *B32B 5/02* | (2006.01) |
| *B32B 7/12* | (2006.01) |
| *D03D 15/00* | (2021.01) |
| *B63H 9/06* | (2020.01) |
| *D03D 13/00* | (2006.01) |
| *B63H 9/067* | (2020.01) |
| *D03D 15/47* | (2021.01) |
| *D03D 15/58* | (2021.01) |

(52) U.S. Cl.
CPC ............... *D03D 1/00* (2013.01); *B32B 5/024* (2013.01); *B32B 7/12* (2013.01); *B63H 9/067* (2020.02); *D03D 13/004* (2013.01); *D03D 15/47* (2021.01); *D03D 15/58* (2021.01); *B32B 2262/0253* (2013.01); *B32B 2262/0261* (2013.01); *B32B 2262/0276* (2013.01); *B32B 2307/544* (2013.01); *B32B 2307/744* (2013.01); *B32B 2605/12* (2013.01); *D10B 2321/02* (2013.01); *D10B 2321/0211* (2013.01); *D10B 2331/02* (2013.01); *D10B 2331/04* (2013.01); *D10B 2401/063* (2013.01); *D10B 2507/04* (2013.01)

(58) Field of Classification Search
None
See application file for complete search history.

(56) References Cited

U.S. PATENT DOCUMENTS

| | | | | |
|---|---|---|---|---|
| 4,554,205 A | * | 11/1985 | Mahr | ..................... B32B 5/026 442/242 |
| 5,304,414 A | * | 4/1994 | Bainbridge | ............ D03D 15/00 442/208 |
| 6,280,546 B1 | * | 8/2001 | Holland | ................... B32B 27/12 156/85 |

FOREIGN PATENT DOCUMENTS

| | | |
|---|---|---|
| DE | 1535634 A1 | 5/1970 |
| JP | S54131094 | * 10/1979 |

OTHER PUBLICATIONS

Niir Board (The Complete Technology Book on Textile Spinning, Weaving, Finishing and Printing, Asian Pacific Business Press, pp. 159) (Year: 2004).*
Machine translation of JPS54131094, Ueda et al. (Year: 1979).*
International Search Report Application No. PCT/EP2017/062677 Completed: Sep. 22, 2017; dated Oct. 10, 2017 3 pages.
Written Opinion of the International Searching Authority Application No. PCT/EP2017/062677 dated Oct. 10, 2017 6 pages.

* cited by examiner

*Primary Examiner* — Shawn Mckinnon
(74) *Attorney, Agent, or Firm* — Whitmyer IP Group LLC

(57) ABSTRACT

A sailcloth including a woven fabric of a first fiber material and a second fiber material woven into it, in which the second fiber material forms a network structure within the woven fabric, with the second fiber material having a higher tearing resistance than the first fiber material and with the second fiber having a sliding ability within the woven fabric.

20 Claims, No Drawings

SAILCLOTH WITH FAIL-SAFE PROPERTIES

TECHNICAL FIELD

The invention relates to a sailcloth with fail-safe properties, comprising a woven fabric of a first fiber material and a second fiber material woven into it, as well as to a sail made from it.

BACKGROUND

Sails, especially spinnakers, are exposed to considerable loads not only under regatta conditions. This leads again and again to a sail tearing, especially under a sudden load, e.g. when setting in strong wind or in sudden strong gusts of wind. Particularly at risk are sails which already show minor mechanical damage, for example, when having had contact with sharp-edged parts of the rig, railing, etc., and/or which have undergone an ageing process due to salt water and UV radiation after longer periods of use.

The forming or existence of such rips or tears usually leads to a total loss of the sail. The sail not only tears partially, but over its entire length and thus will fail to provide propulsion. Depending on the conditions, the uncontrolled flapping back and forth of the torn sail can result in dangerous situations on board, with the maneuverability being reduced or even lost in the event no spare sail/engine is available.

It would therefore be desirable to have a sailcloth from which a sail can be made which in case of an emergency has fail-safe characteristics, that is, does not tear or rip up entirely.

SUMMARY

It is, therefore, the objective of the present invention to provide a sailcloth that lends fail-safe emergency properties to sails, even after prolonged periods of use.

This objective is achieved with a sailcloth of the kind first mentioned above, in which the second fiber material forms a regular network structure within the woven fabric, with the second fiber material having a higher tearing resistance and sliding ability than the first fiber material.

The sailcloth proposed by the present invention consists of a woven fabric in which two fiber materials are combined. These are fiber materials which are commonly used in sports sailing but which differ in their properties to such an extent that they prevent the sailcloth or sail from being torn/ripped up completely.

The underlying principle in this case is that the second fiber material, which is incorporated into the basic fabric of the sailcloth, has a higher tearing resistance and a higher sliding capability than the first fiber material.

On the one hand, the second fiber material is more resistant to the forces that may arise, i.e. it does not tear or be ripped up so easily. However, this alone is not sufficient to prevent a rip from propagating along the entire sail. The loads and forces applied must be absorbed. This is achieved by the fact that the second fiber material is able to slide within the structure of the woven fabric in the event very high loads have to be coped with. When the first fiber material is torn, the second fiber material partially retracts out of the fabric without losing its integrity and in this way bridges the tear, for example also by the convolution or twisting of fiber strands. In this way the propagation of a tear in the sail is limited and a sufficient remainder of functionality is maintained.

For this purpose, it is completely sufficient for the second fiber material to form a more or less regular network structure within the woven fabric, wherein the individual fibers maintaining a distance to neighboring fibers, for example in the range of between 0.5 and 2 cm.

In accordance with the invention, the sailcloth consists of a woven fabric that, if considered expedient, can be laminated with a film to reduce its permeability to wind. The matrix of this sail consists of a first fiber material, which usually is a commonly known polyester and/or polyamide. A more or less regular network structure made of a second fiber material is woven into the fabric that consists of a first fiber material, with the second fiber material having higher strength and better sliding capability in the fabric than the first fiber material. Polyester and/or polyolefin fibers are particularly suitable as second fiber material.

As far as the higher tearing resistance of the second fiber material is concerned, polyolefin fibers are the first choice. Polyethylene fibers, such as those marketed under the Dyneema® brand, are particularly worthy of mention here. These are fibers having a highly parallel orientation of the polyethylene chains.

Polyester can also be used as a second fiber material, which can be combined with polyamide, for example. It is important in this case that the selected polyester material has a higher tensile strength than the polyamide material.

Aside from a high tearing resistance and tensile strength, the second fiber material has improved sliding properties in the fabric compared to the first fiber material. Under load, this causes the fibers to pull out of the tearing fabric composite and in this way be capable of absorbing energy. Although this may allow a tear/rip to form in the woven fabric composed of the first fiber material, the bridging fibers of the second fiber material prevent this tear/rip from widening and propagating. The second fiber material quasi forms a kind of bridge structure, to some extent also under plying or twisting, and is thus able to stop the tear/rip from spreading.

The second fiber material is, in particular, a polyethylene material marketed under the brand name Dyneema® having a weight of between 110 and 330, in particular around 220 dtex.

As provided by the invention, the weight ratio of the fibers of the first and second material ranges between 1:1 and 1:3 and preferably is in the range of between 1:1.5 and 1:2.

Coatings can be applied to influence the sliding properties of fiber materials. For this purpose, the fibers of the first fiber material can be coated with an agent that reduces the sliding properties, and/or the fibers of the second fiber material can be coated with an agent that increases the sliding properties. A coating of the first fiber material can, for example, be a polyurethane coating.

Polyethylene fibers usually have a higher sliding capability within a woven fabric than polyester or polyamide fibers. In this respect, treatment of this fiber material to increase its gliding properties is not necessary as a rule. However, if another fiber is used as second fiber material, such as a polyester fiber or a polyamide fiber, the gliding properties can be increased by applying a suitable coating. Silicone coatings, such as those offered by the company of Wacker under the name FINISH CT 51 L, are considered particularly suitable. The film thickness of the coating applied to the fiber will normally not exceed 1% of the fiber diameter, a film thickness which still ensures sufficient adhesion within the fabric. In case of loads acting on the sail, however, the treated threads will elude the tearing force by their sliding movement within the fabric. The tear/rip is stopped if the tearing force is less than the sum of the friction forces.

Moreover, numerous sliding agents, often also referred to as spinning oils, are known from textile practice for the treatment of fibers.

The fibers of the first fiber material can also be roughened to reduce sliding.

As a rule, staple fibers and/or multifilaments can be used for the first and second fiber materials. In particular, however, the second fiber material consists of multifilaments, which give the material a particularly high tensile strength and tear resistance, especially when Dyneema® fibers are used.

The sailcloth proposed by the invention can be provided with a laminated film to increase its imperviousness. Such a film is bonded with the fabric either thermally or adhesively using glue. Underneath such a laminated film, reinforcement filaments can be arranged in the usual way, which run along the load lines commonly known to exist in the sail.

A sailcloth according to the invention has in particular a weight per unit area of 30 to 200 g/m$^2$, in particular 60 to 120 g/m$^2$, and is therefore particularly suitable for large-area sails, for example spinnakers.

The second fiber material forms a network structure within the fabric of the sailcloth, with the fibers of the second fiber material crossing each other, preferably at an angle of 90°. The fibers are arranged with a relatively large distance between them compared to the distance between the fibers of the first material, and, for example, form squares or rectangles with an edge length ranging between 0.5 and 2 cm. A higher network density is not needed usually, as the fiber material does not play a role in terms of technical sailing properties of the sailcloth. Its primary purpose is to improve the tearing resistance and ensure that a fail-safe behavior is achieved in the event of emergencies.

The inventive sailcloth is suitable for the manufacture of sails which have to withstand special stress conditions. In regatta sports and racing this sailcloth is especially employed for the production of spinnakers, which have a certain tendency to tear, especially when setting and in suddenly occurring gusts of wind.

The invention claimed is:

1. A sailcloth having fail-safe properties, comprising a woven fabric of a first fiber material and a second fiber material woven into it,
   wherein the second fiber material forms a network structure within the woven fabric, with the second fiber material having a higher tearing resistance and sliding ability than the first fiber material, and
   wherein the first fiber material having a lower sliding ability is provided with a coating that reduces the sliding ability of the first fiber material.

2. The sailcloth according to claim 1, wherein the first fiber material consists of polyester and/or polyamide.

3. The sailcloth according to claim 1, wherein the second fiber material consists of polyester and/or polyolefin.

4. The sailcloth according to claim 1, wherein as the first fiber material polyamide is combined with polyester or polyolefin as the second fiber material or polyester is combined as the first fiber material with polyolefin as the second fiber material.

5. The sailcloth according to claim 1, wherein the second fiber material is a high strength polyethylene.

6. The sailcloth according to claim 5, wherein the polyethylene has a weight ranging between 110 and 330 dtex.

7. The sailcloth according to claim 1, wherein the first fiber material is provided with a polyurethane coating and/or the second fiber material is coated with a silicone.

8. The sailcloth according to claim 1, wherein the first and the second fiber material consists of staple fibers and/or multifilaments.

9. The sailcloth according to claim 1, wherein the second fiber material consists of multifilaments.

10. The sailcloth according to claim 1 provided with laminated film to increase its imperviousness.

11. The sailcloth according to claim 10 provided with reinforcing filaments aligned to the load profiles.

12. The sailcloth according to claim 1 having a weight per unit area of between 30 and 200 g/m$^2$.

13. The sailcloth according to claim 1 having a network structure in which the fibers of the second fiber material intersect at an angle of 90°.

14. The sailcloth according to claim 13, wherein the network structure of the second fiber material forms squares or rectangles having an edge length in the range of between 0.5 and 2 cm.

15. Sails, manufactured of a sailcloth comprising a woven fabric of a first fiber material and a second fiber material woven into it, wherein the second fiber material forms a network structure within the woven fabric, with the second fiber material having a higher tearing resistance and sliding ability than the first fiber material, and wherein the first fiber material having a lower sliding ability is provided with a coating that reduces the sliding ability of the first fiber material.

16. The sailcloth according to claim 1, wherein the network structure comprises a regular pattern.

17. The sailcloth according to claim 1, wherein the second fiber material slides within the woven fabric when the sailcloth is placed under load.

18. The sailcloth according to claim 2, wherein the second fiber material consists of polyester and/or polyolefin.

19. The sailcloth according to claim 1, wherein the second fiber material is provided with a coating that increases the sliding ability.

20. The sails according to claim 15, wherein the second fiber material is provided with a coating that increases the sliding ability.

* * * * *